Aug. 1, 1950

S. C. SELEY 2,517,247

COMBINED SCRAPING AND CLEANING DEVICE FOR
WINDSHIELDS OR THE LIKE
Filed Jan. 2, 1947

INVENTOR
Sidney C. Seley
BY
Florian D. Miller
ATTORNEY

Patented Aug. 1, 1950

2,517,247

UNITED STATES PATENT OFFICE 2,517,247

COMBINED SCRAPING AND CLEANING DEVICE FOR WINDSHIELDS OR THE LIKE

Sidney C. Seley, Erie, Pa.

Application January 2, 1947, Serial No. 719,743

1 Claim. (Cl. 15—105)

This invention relates generally to cleaning devices and more particularly to a novel de-icing and scraping device for scraping, de-icing, and cleaning a windshield or any other smooth surface.

Putty knives and other metal scraping devices are now used for removing the ice from windshields but it has been found that the glass becomes scratched and after a certain period of time, the windshield is ruined. Furthermore, when a metal scraping device is used in freezing weather, it becomes inoperative in a very short time because of a layer of ice which forms on the metal scraping device and makes it inoperative. These prior scraping devices have been difficult to grasp with one hand and no means has heretofore been provided to permit the exertion of lateral pressure.

It is, accordingly, an object of my invention to provide a novel scraping, de-icing and cleaning device which overcomes the above and other defects in present scraping, de-icing, and cleaning devices and it is more particularly an object of my invention to provide a scraping, cleaning and de-icing device which is simple in construction, economical in cost, efficient in operation, and economical in manufacture.

Another object of my invention is to provide a novel easily grasped scraping device which has several scraping edges of various degrees of convergence on one simple article of manufacture.

Another object of my invention is to provide a simple cleaning and de-icing device which provides two scraping surfaces and a squeegee.

Another object of my invention is to provide a novel means for permitting pressure to be applied to a scraping, cleaning and de-icing device laterally thereof.

Figure 1:
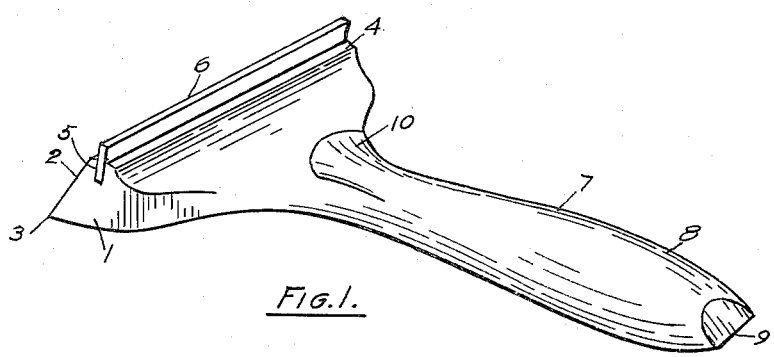
Figure 2:
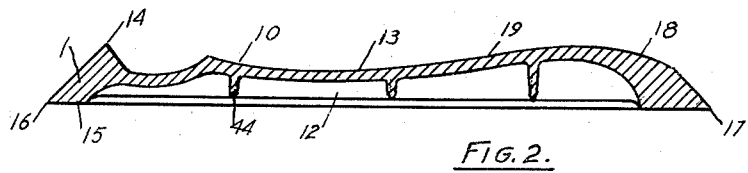
Figure 3:
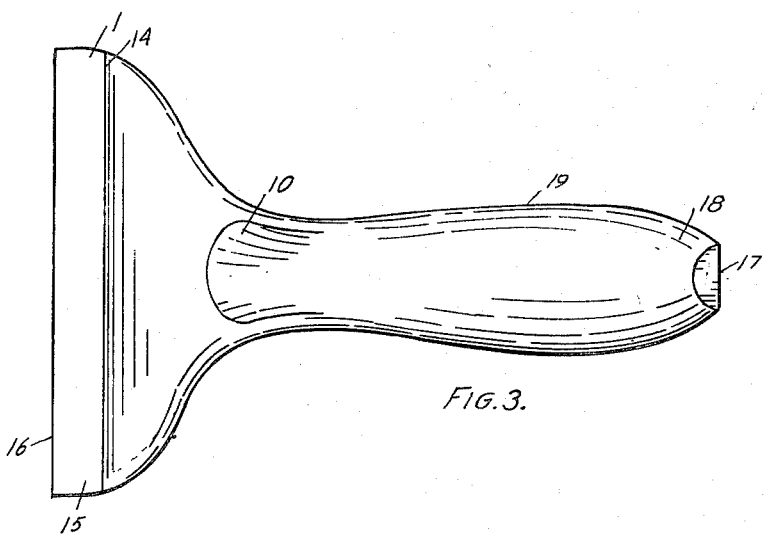

Other objects of my invention will become evident from the following detailed description, taken in conjunction with the accompanying drawings, in which Fig. 1 is a perspective view of one illustration of my novel device with a rubber squeegee on the head thereof;

Fig. 2 is a vertical sectional view of another embodiment of my invention with two oppositely disposed scraping edges on the head of my novel device and a heavy blunt scraping edge on the handle end of my novel device; and Fig. 3 is a plan view of my novel scraping and de-icing device shown in Fig. 2.

Referring now to the drawings, Fig. 1 shows a unitary article of manufacture molded in conventional molds from a suitable plastic material, although it may be made from any other suitable material. My novel device comprises a transversely extending head 1 having the straight-line leading portion 2 tapered downwardly and converging at point or edge 3 to provide a broad, comparatively sharp, scraping edge particularly suitable for removing ice from a windshield, window, or other smooth surface. In the upper flat portion 4 of the transverse head 1, I provide a transversely extending slot 5 for receiving a rectangular shaped rubber member 6 for utilization as a squeegee to clean a windshield when the ice has been loosened and a considerable amount of water is present on the windshield. The squeegee 6 may also be used after ice is scraped from the windshield and a certain amount of liquid still remains on the windshield which must be removed for safe driving. Integral with and extending outwardly and laterally from the head 1 is a handle 7 having the outer end 8 thereof enlarged and built up so as to reinforce a comparatively heavy blunt edge 9 formed on the outer end of the handle opposite to the leading edge 3 on the head 1. An arcuate shaped recessed portion 10 is disposed on the upper part of the handle 7 adjacent the head 1 to provide a resting place for the thumb when the handle 7 is grasped, wherein lateral pressure may be applied to the head 1 when ice is being scraped from a window by means of the sharp edge 3 of the head 1. It will be evident that the cleaning and the de-icing member shown in Fig. 1 may be made solid but in order to conserve material I have built the body of my novel device as shown in Fig. 2 with the recessed portions 12 formed in the body portion 13 of my novel device. Ribs 44 extend longitudinally and transversely of my novel device to give strength, rigidity and durability thereto. The device shown in Figs. 2 and 3 is the same as the device shown in Fig. 1 except that instead of providing a slot 5 in the flat surface 4 on the upper side of the head 1 as in Fig. 1, I have provided a comparatively sharp scraping edge 14 on the upper side of the head 15, which extends opposite in direction to the scraping edge 16 and also has a heavy blunt scraping edge 17 on the built-up end 18 of the handle 19. In this construction, there are three scraping edges 14, 16 and 17 on my novel device. The edges 14 and 16 are preferably connected by a straight-line surface.

In operation, the handle 7 is grasped by the hand and the thumb is disposed in the recessed portion 10 of the handle 7. The leading edge 3 of head 1 is then placed against a windshield and pressure is exerted by the thumb of the user and ice is scraped from the windshield. When the ice is too heavy, or heavy formations of ice are formed in corners of the windshield, the heavy built-up butt end 9 of my novel member is used. If any water remains on the windshield from the melting of the ice, squeegee 6 can then be used to remove the water from the windshield. In the event that my novel device shown in Figs. 2 and 3 is used, the same operation as in Fig. 1 is performed except that the scraping edge 14 of heavier construction than the scraping edge 16 but not nearly as heavy as the built-up scraping edge 17 is provided for ice formations which may be too heavy for the scraping edge 16 and not heavy enough to use the blunt built-up scraping edge 17 on the end of the handle 19. It will be evident that my novel cleaning and scraping member is preferably made of a nonmetallic material so that no ice will form thereon and so that all scraping surfaces will be clean and in a condition to do an efficient job at all times. My novel scraping and cleaning device can be kept in a car without deterioration or rust and lasts over many years. It is very economical in cost in that it can be made in one operation for only a few cents. It will provide a ready means for removing ice from a windshield thereby increasing the safety of automobile operation on the road.

Although applicant is aware that metal scraping devices have been provided and have been on the market for a great number of years, nevertheless, he has overcome the defects inherent in such devices and therefore he has provided a novel article of manufacture which is capable of removing the ice from a windshield in the matter of a few seconds and which does not have ice forming on the device itself, thereby making it an efficient operating device which has not been heretofore provided. Furthermore, applicant provides a simple device which has scraping edges of different convergences so as to be able to cope with any thickness of ice formation on a windshield or the like.

Various changes may be made in the specific embodiment of my invention without departing from the spirit thereof, or from the scope of the appended claim.

What I claim is:

An article of manufacture of the class described comprising a molded plastic member having a transversely extending head with a transversely, forwardly extending scraping edge and a transversely extending slot on the upper side thereof opposite to said scraping edge adapted to receive a squeegee member, a hollow handle of arcuate cross section, transversely extending ribs for strengthening said head and arcuate shaped handle, and a recessed portion on the forward end of said handle adjacent said head for disposing the thumb of a person using said article when the hand is grasping said handle to exert lateral pressure on said scraping edge on said head.

SIDNEY C. SELEY.

REFERENCES CITED

The following references are of record in the file of this patent:

UNITED STATES PATENTS

| Number | Name | Date |
| --- | --- | --- |
| 128,010 | Bernard | June 18, 1872 |
| 465,825 | Atwood | Dec. 29, 1891 |
| 562,072 | Dunham | June 16, 1896 |
| 585,346 | Stewart | June 29, 1897 |
| 673,506 | Pitts | May 7, 1901 |
| 896,394 | Kindred | Aug. 18, 1908 |
| 1,434,744 | Hibbler | Nov. 7, 1922 |
| 1,628,243 | Hagen | May 10, 1927 |
| 1,730,820 | Holden | Oct. 8, 1929 |
| 1,872,939 | Haddican | Aug. 23, 1932 |
| 1,898,690 | Schacht | Feb. 21, 1933 |
| 2,013,545 | Stevens | Sept. 3, 1935 |
| 2,271,285 | Bussert | Jan. 27, 1942 |